United States Patent [19]

Weissenfels et al.

[11] 4,111,911

[45] Sep. 5, 1978

[54] METHOD OF HARDENING LIQUID RESOLS

[75] Inventors: Franz Weissenfels, Siegburg; Hans Jünger, Troisdorf, both of Germany

[73] Assignee: Dynamit Nobel Aktiengesellschaft, Troisdorf, Germany

[21] Appl. No.: 616,539

[22] Filed: Sep. 25, 1975

Related U.S. Application Data

[60] Continuation of Ser. No. 386,675, Aug. 8, 1973, abandoned, which is a continuation of Ser. No. 201,244, Nov. 22, 1971, abandoned, which is a division of Ser. No. 830,865, Jun. 5, 1969, abandoned.

[30] Foreign Application Priority Data

Jun. 6, 1968 [DE] Fed. Rep. of Germany ....... 1769535

[51] Int. Cl.$^2$ .................... C08G 8/10; C08K 3/04; C08K 3/24; C08K 3/30; C08K 3/36; C08K 3/38
[52] U.S. Cl. .................... 260/38; 260/2.5 F; 264/331; 521/103; 521/118; 521/121; 521/181; 528/138; 528/137
[58] Field of Search ................ 260/59 R, 38; 264/331

[56] References Cited

U.S. PATENT DOCUMENTS

| | | | |
|---|---|---|---|
| 2,252,331 | 8/1941 | Payne | 260/38 |
| 2,319,142 | 5/1943 | LeBach | 260/38 |
| 2,608,536 | 8/1952 | Sterling | 260/59 X |
| 2,623,865 | 12/1952 | Dietz | 260/38 X |
| 2,655,490 | 10/1953 | Sonnabend | 260/59 X |
| 2,669,552 | 2/1954 | Seymour et al. | 260/38 X |
| 2,673,190 | 3/1954 | Dietz | 260/38 |
| 3,313,766 | 4/1967 | Lorentz et al. | 260/59 X |
| 3,536,575 | 10/1970 | Maitrot | 260/2.5 F |
| 3,549,584 | 12/1970 | Sekera | 260/38 |

OTHER PUBLICATIONS

Martin, Chemistry of Phenolic Resins, 1956, p. 150.
Carswell, Phenoplasts, 1947, pp. 75, 95–98.
Simonds, Handbook of Plastics, 1944, pp. 237–238.
Gould, Phenolic Resins, 1959, p. 62.
Whitehouse et al., Phenolic Resins, 1967, pp. 33, 98, 120, 122–124.
Encyclopedia of Chem. Technology, Kirk et al., 1964, p. 356.

*Primary Examiner*—Howard E. Schain
*Attorney, Agent, or Firm*—Burgess, Dinklage & Sprung

[57] ABSTRACT

Process for hardening liquid resols comprising using for the hardening, strong acids which if they are solid at room temperature are used in the form of their mixtures with inert finely divided solid diluents or if they are liquid or gaseous at room temperature adsorbed onto an adsorbing agent.

8 Claims, No Drawings

METHOD OF HARDENING LIQUID RESOLS

This is a continuation, of application Ser. No. 386,675, filed Aug. 8, 1973, now abandoned.

This invention relates to a process of hardening liquid resols, the end-products of which are formed or compact. More particularly this invention relates to an improved process for hardening liquid resols with strong acids.

It is in the prior art to harden condensation products prepared from phenols and aldehydes, such as for example, phenol resols by the addition of strong acids thereto. The acids which have been used include hydrochloric acid, sulfuric acid, phosphoric acid, trichloroacidic acid, organic sulfonic acids, etc. These acids are used in the form of aqueous solutions in concentrations usually ranging from 20 to 60%. Higher concentrations are not used as these would result in a loss of control of the foaming or hardening reaction. However, when hardeners having an acid content under 20% are used, large amounts of water are introduced into the mixture, which block the hardening or setting reaction and often result in cracks and voids in the completely hardened product. Hardeners prepared from highly volatile acids, such as HCl or $HNO_3$ or mixtures thereof with other strong or weak non-volatile acids such as sulfuric or phosphoric acid, have the additional disadvantage that the resultant phenolic resin foams, which contain residues of the acid hardening mixtures and have a strongly corrosive effect on any metal parts which may be embedded in them, or which later come in contact with the hardened resin or foam.

It is an object of the present invention to provide an improved process for hardening liquid resols using acid catalysts.

A further object is to provide for resol hardening reactions a hardening agent which has improved reactivity at or in the range of room temperature and which is readily dispersible in the resol at such temperatures without the need for any dispersing liquid.

Another object is to provide a process for hardening liquid resols using acid catalysts providing products which are free of cracks and flaws and which do not give rise to corrosive effects.

In accordance with the invention it has now been found that the above objects are achieved and that the disadvantages of prior teachings are obviated by the use of as hardening agent for hardening liquid resols of strong acids which if they are solid at room temperature, in the form of their mixtures with inert finely divided solid diluents or if they are liquid or gaseous at room temperature adsorbed onto an adsorbing agent.

The use of solid acid products in powder form according to the invention has the advantage that the time that is required for dissolving the solid acid, for example, p-toluene-sulfonic acid in the water content of the liquid resins results in a longer pot life for the resin-hardener mixture. This is particularly desirable when the plastic is intended for use in automatic feeding machines. After the hardening process has started, it proceeds more rapidly inasmuch as no solvent has been introduced in the mixture with the solid hardening agent to interfer with the reaction. The absence of solvents furthermore results in that smaller quantities of volatile components are present in the fully hardened end product. This has a favorable effect on the mechanical strength of the hardened resin and also helps to reduce shrinkage on exposure to high temperatures. It has been found that articles made from casting resins prepared according to the invention are less sensitive against tension cracks tension than those which are obtained with the conventional liquid hardeners. It has furthermore been found that resins hardened according to the invention are less corrosive to metals or other acid-sensitive substances, such as paper backings, than is the case when aqueous splutions of strong acids are used as hardeners.

The use of solid hardeners in powder form according to the invention furthermore makes it possible to admix the same together with other powdered solids and to introduce the same in this form into the liquid phenolic resin in a single step. Instances of such other solids include, for example, fire retardants, regulators for viscosity and reactivity and fillers.

The diluting agents suitable for use according to the invention in admixture with the strong acids which are solid at room temperature include, for example, highly disperse $SiO_2$, active charcoal, bentonite, boric acid, boron trixoide and the like, along or in combination if desired. The strong acid content in the hardener can range between 5 and 50%, the amount of strong acids used as hardening agents can range from 2–20% of the resol.

When strong acids which are liquid or gaseous at room temperature are used, such as hydrochloric acid, sulfuric acid, phosphoric acid or di or trichloroacetic acid, the same being held by adsorbing agents, such as bentonite, boric acid, charcoal, $SiO_2$ and the like, the acid content is, of course, limited by the adsorptive capacity of the adsorbing agent. The hardeners according to the invention must be free-flowing and easy to incorporate into the resin, so that the particle size of the diluent or adsorbing agent should range between 10 and 50 millimicrons.

In addition to the already mentioned p-toluenesulfonic acid, other phenol sulfonic acids which are solid at room temperature can be used, and if desired they may be substituted on the aromatic ring. Examples of such acids include benzenesulfonic acid, o-, m-, and p-cresolsulfonic acids, chlorobenzene-3,5-disulfonic acid, bromobenzene-4-sulfonic acid or aniline-2,5-disulfonic acid. The sulfonic acid group can also be joined to a polynuclear aromatic radical, as in the case, for example, with the naphthenesulfonic acids or the naphthylaminesulfonic acids. Aliphatic sulfonic acids, such as butylsulfonic acid, propylsulfonic acid or hexylsulfonic acid, can also be advantageously used according to the invention.

The resols to be hardened with the solid catalyst are preferably those which are prepared by condensing one mol of a phenol with 1 to 3 mols of aldehydes in the alkaline medium, followed by removal of the water split off by distillation until the solid resin content is 60 to 80%. By phenols are meant phenols as well as their homologs and alkyl substitution products, such as resorcinol, pyrocatechol, the cresols and xylenols, or mixtures of these compounds. The aldehydes which are reacted with the phenols include, among others, formaldehyde, compounds which decompose to give formaldehydes, such as paraformaldehyde or trioxane, acetaldehyde, furfurol and hexamethylenetetramine, as well as mixtures of these compounds.

After the water has been distilled off, the phenolic resol resin is adjusted, if desired, to a pH value greater than 4. In the case of using the resol-resins to make a phenolic foam, the addition of 2 to 5% of a surface-active agent, e.g. an oxethylated castor oil, is necessary.

The following Examples are given as illustrative of the invention, but are not to be construed as limiting the scope thereof. The hardening agents are prepared by milling and mixing of the components in the case of solid and liquid acids; when using at room-temperature gaseous acids, these are adsorbed by the above-named materials, the adsorbing taking place by passing the gas through the adsorbing material.

The foamed end-products are used mainly as isolating materials; the casting-resins are used for the manufacturing of reproductions (molded articles) of every kind.

EXAMPLE 1

Using a high-speed stirring mechanism (propeller stirrer rotated at about 1500 rpm), an intimate mixture was prepared from 10 kg of a foamable phenolic resin, 600 ml of n-pentane as foaming agent and 700 g of a hardener in powder form which consisted of 100 parts by weight of p-toluensulfonic acid and 11 parts by weight of highly disperse silicon dioxide (particle size average-30 millimicrons). This mixture was poured into a mold lined with soda kraft paper and which was open at the top (dimensions approximately 50 cm $\times$ 50 cm $\times$ 100 cm). The foaming and hardening were carried out at room temperature over a period of about 70 minutes. A phenolic resin foam material resulted which had a uniform, very fine-pored structure, a density of 0.042, and a compressive strength of 3.4 kp/cm$^2$. Following drying of the foam at 100° C, it underwent a weight loss of 11.8% in 24 hours.

EXAMPLE 2

A foamable phenolic resin, the same as in example 1, was prepared as follows: 143 parts by weight of phenol were condensed with 228 parts of a 30% aqueous formaldehyde solution in the presence of 0.0715 parts by weight of sodium hydroxide, in aqueous solution, for 70 minutes at 100° C. The reaction mixture thus obtained was then distilled in a vacuum to a solid resin content of 72 – 78%. This resin had, at 20° C, a viscosity of 4000 to 7000 cP (Hoeppler). Of this resin, 18 kg were intimately mixed, using a high-speed stirring mechanism (propeller stirrer rotated at about 1500 rpm) with 600 ml of n-pentane as foaming agent and 840 g of a hardener in powder form, which consisted of 100 parts by weight of phenolsulfonique acid and 11 parts by weight of highly disperse silicon dioxide (particle size average-30 millimicrons). This mixture was poured into a mold, lined with soda kraft paper and which was open at the top (dimensions approximately 50 cm $\times$ 50 cm $\times$ 100 cm). The foaming and hardening were carried out at room temperature over a period of about 75 minutes. A phenolic resin foam material resulted, which had a uniform, very fine-pored structure, a density of 0.05, and a compressive strength of 3.7 kp/cm$^2$. Following drying of the foam at 100° C, it underwent a weight loss of 11.6% in 24 hours.

EXAMPLE 3

A phenolic foam was prepared in the same manner as in the foregoing example with the difference, that a hardener was used, which consisted of 100 parts by weight of benzeneusulfonique acid and 10 parts by weight of highly disperse silicon dioxide. The foaming and hardening took place within about 60 minutes. The foam had a uniform structure, a density of 0.05 and a compressive strength of 3.4 kp/cm$^2$.

EXAMPLE 4

Using an automatic proportioning and mixing apparatus, a mixture having the following composition was prepared: - 100 weight-parts of phenolic foam resin, 6 weight-parts of n-pentane as foaming agent, and 24 weight-parts of a powdered hardener (fineness: 100 mesh) which consisted of 100 parts by weight of p-toluene-sulfonic acid, 81 parts of boric acid, 95.5 parts boron trioxide, and 22 parts of highly disperse SiO$_2$. The boric acid in this instance served simultaneously as a flame retardant, the boron trioxide also influencing the reactivity and therewith the foaming rate and hardening rate, as the boron trioxide reacted with the water content of the resin in an exothermic reaction forming boric acid.

The thusly obtained mixture was fed continuously between the bands of a double-belt press which was heated to about 40° C. After a period of 12 minutes while in position between the moving belts, the foamable mixture had filled up the given volume. The fully hardened foam boards which formed had the following characteristics: density 0.063, compressive strength 5.5 kp/cm$^2$. The volatile components which evaporated in 24 hours at 100° C amounted to 19.8%.

EXAMPLE 5

A phenolic casting resin was intimately mixed with 30 weight-parts of a solid, powdered hardener consisting of montmorillonite on which about 12% by weight of hydrochloric acid had been absorbed. The hardener in this form was a dry, free-flowing product.

The resulting mixture was cast in a flat, rubber-elastic mold of soft PVC heated to 40° C, to form a board, and it was hardened within 45 minutes into a hard, infusible body. Its compressive strength (DIN 53454) amounted to 830 kp/cm$^2$, and its flexural strength (DIN 53452) amounted to 580 kp/cm$^2$. In contrast to products which had been hardened with liquid hardeners, for instance with 20% hydrochloric acid, the articles produced in accordance with the invention had no tension cracks after storage for 500 to 1000 hours at 100° C.

We claim:

1. In a process for producing a molded article from a liquid resol wherein into a mold there is introduced a liquid-form resol consisting essentially of the product formed by condensing 1 mol of a phenol with 1–3 mols of an aldehyde in an alkaline medium followed by water removal until the resin has a solid content between 60 and 80% and the mixture contains a hardener and in said mold the mixture is hardened to form a molded article, the improvement which comprises introducing said hardener into the liquid-form resol as a hardener mixture consisting essentially of said hardener and a diluent, said diluent being selected from the group consisting of silica, activated charcoal, bentonite, boric acid and boron trioxide, the hardener being a solid aromatic sulfonic acid selected from the group consisting of p-toluene sulfonic acid, a non-dyeing solid phenol sulfonic acid, o, m or p cresol sulfonic acid, chloro benzene 3,5-disulfonic acid, bromo benzene-4-sulfonic acid, aniline 2,5-disulfonic acid, naphthalene sulfonic acid and naphthylamine sulfonic acid and the diluent having a particle size between 10 and 50 millimicrons, the combined amount of sulfonic acid hardener and diluent which is added to the resol resin being such that the acid hardener is present in an amount of 2 to 20% by weight based upon the weight of said resol.

2. A process according to claim 1 wherein said free-flowing hardener mixture is formed by mixing and milling said solid aromatic sulfonic acid with said diluent.

3. A process according to claim 1 wherein the hardener-diluent mixture is in the form of a fine powder.

4. Process according to claim 1 wherein said resol contains a foaming agent, the mixture and said foaming agent are foamed up whereby to prepare a foamed article.

5. A process according to claim 4 wherein the hardener-diluent mixture is in the form of a fine powder.

6. A process according to claim 1 wherein said diluent is boric acid.

7. A process according to claim 4 wherein said diluent is boric acid.

8. A process according to claim 1 wherein said diluent is silica.

* * * * *

UNITED STATES PATENT AND TRADEMARK OFFICE
CERTIFICATE OF CORRECTION

PATENT NO. : 4,111,911

DATED : September 5, 1978

INVENTOR(S) : Franz Weissenfels et al

It is certified that error appears in the above-identified patent and that said Letters Patent are hereby corrected as shown below:

Column 1, line 3, after "abandoned" insert -- which is a continuation of Serial No. 201,244, filed November 22, 1971 (now abandoned) which, in turn, is a division of Serial No. 830,865, filed June 5, 1969 (now abandoned) --.

Column 1, lines 14-15, "trichloroacidic" should read -- trichloroacetic --.

Column 1, line 63, "interfer" should read -- interfere --.

Column 2, line 8, "splutions" should read -- solutions --.

Column 2, line 21, "along" should read -- alone --.

Column 2, line 30, "boric acid" should read -- montmorilonite --.

Column 3, line 66, "benzeneusulfonique" should read -- benzenesulfonic --.

Column 4, line 1, "has" should read -- had --.

Signed and Sealed this

Seventeenth Day of July 1979

[SEAL]

Attest:

LUTRELLE F. PARKER

*Attesting Officer*    *Acting Commissioner of Patents and Trademarks*